(12) United States Patent
Tuttle

(10) Patent No.: US 8,400,297 B2
(45) Date of Patent: Mar. 19, 2013

(54) POWER CONSERVING ACTIVE RFID LABEL

(75) Inventor: Mark E. Tuttle, Meridian, ID (US)

(73) Assignee: Round Rock Research, LLC, Mt. Kisco, NY (US)

( * ) Notice: Subject to any disclaimer, the term of this patent is extended or adjusted under 35 U.S.C. 154(b) by 774 days.

(21) Appl. No.: 12/115,149

(22) Filed: May 5, 2008

(65) Prior Publication Data

US 2009/0273473 A1 Nov. 5, 2009

(51) Int. Cl.
*G08B 1/08* (2006.01)

(52) U.S. Cl. ............... 340/539.3; 340/572.1; 340/10.33; 340/10.34

(58) Field of Classification Search ............... 340/572.1, 340/10.1, 10.34, 10.33, 7.32, 7.36, 7.37, 340/693.3, 539.3; 455/343.1–343.6
See application file for complete search history.

(56) References Cited

U.S. PATENT DOCUMENTS

| | | | | |
|---|---|---|---|---|
| 6,263,200 | B1 * | 7/2001 | Fujimoto | 455/343.5 |
| 6,882,274 | B2 * | 4/2005 | Richardson et al. | 340/539.13 |
| 7,610,035 | B2 * | 10/2009 | Van Bosch et al. | 455/343.2 |
| 7,795,877 | B2 * | 9/2010 | Radtke et al. | 324/530 |
| 2008/0162968 | A1 * | 7/2008 | Breen et al. | 713/323 |
| 2009/0128292 | A1 | 5/2009 | Greeff et al. | |
| 2010/0150208 | A1 | 6/2010 | Bhogal et al. | |

OTHER PUBLICATIONS

USPTO Transaction History of related U.S. Appl. No. 11/942,353, filed Nov. 19, 2007, entitled "RFID Device Time Synchronization From a Public Source."
Greeff. Roy. U.S. Appl. No. 11/942,353; "RFID Label Time Synchronization", filed Nov. 19, 2007.

* cited by examiner

*Primary Examiner* — Jennifer Mehmood
*Assistant Examiner* — Nay Tun
(74) *Attorney, Agent, or Firm* — Lerner, David, Littenberg, Krumholz & Mentlik, LLP

(57) ABSTRACT

Methods and apparatus, including computer program products, for a power conserving active RFID label. A system for performing radio frequency (RF) communications includes a radio frequency identification (RFID) tag attached to one or more items to be tracked, the RFID tag configured to receive a request and a time interval indicating a time for determining a temperature and a battery voltage, and to adjust the time interval at a time of determining the temperature and the battery voltage if the detected voltage is less than a predetermined voltage, and an interrogator communicatively coupled to one or more antennas to transmit one or more requests to the RFID tag and to receive one or more responses, at least one response including a time, temperature and battery voltage.

14 Claims, 5 Drawing Sheets

POWER CONSERVING ACTIVE RFID LABEL

BACKGROUND

The present invention relates to radio frequency identification (RFID), and more particularly to a power conserving active RFID label.

RFID is a technology that incorporates the use of electromagnetic or electrostatic coupling in the radio frequency (RF) portion of the electromagnetic spectrum to uniquely identify an object, animal, or person. With RFID, the electromagnetic or electrostatic coupling in the RF (radio frequency) portion of the electromagnetic spectrum is used to transmit signals. A typical RFID system includes an antenna and a transceiver, which reads the radio frequency and transfers the information to a processing device (reader) and a transponder, or RF label, which contains the RF circuitry and information to be transmitted. The antenna enables the integrated circuit to transmit its information to the reader that converts the radio waves reflected back from the RFID label into digital information that can then be passed on to computers that can analyze the data.

SUMMARY

The present invention provides methods and apparatus, including computer program products, for a power conserving active RFID label.

In one aspect, the invention features a radio frequency identification (RFID) tag including a substrate, an antenna on the substrate, and an integrated circuit operably coupled to a temperature sensor and to the antenna to receive a time interval from a RFID interrogator, the time interval indicating a time for determining a temperature and a battery voltage, the integrated circuit configured to adjust the time interval at a time of determining the temperature and the battery voltage if the detected voltage is less than a predetermined voltage.

In another aspect, the invention features a radio frequency identification (RFID) interrogator including one or more antennas, a receiver communicatively coupled to at least one of the one or more antennas to receive a response from a radio frequency identification (RFID) tag, the response including time, temperature and battery voltage, a transmitter communicatively coupled to at least one of the one or more antennas to transmit requests, and a control unit communicatively coupled to the transmitter and the receiver, wherein the receiver is configured to receive the response and adjust a time interval in the RFID tag for determining a temperature and a battery voltage if the battery voltage in the response is less than a predetermined voltage.

In another aspect, the invention features a system for performing radio frequency (RF) communications, the system including a radio frequency identification (RFID) tag attached to one or more items to be tracked, the RFID tag configured to receive a request and a time interval indicating a time for determining a temperature and a battery voltage, and to adjust the time interval at a time of determining the temperature and the battery voltage if the detected voltage is less than a predetermined voltage, and an interrogator communicatively coupled to one or more antennas to transmit one or more requests to the RFID tag and to receive one or more responses, at least one response including a time, temperature and battery voltage.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

Radio frequency identification (RFID) labels can be intelligent or just respond with a simple identification (ID) to radio frequency (RF) interrogations. The RFID label can contain memory. This memory can be loaded with data either via an interrogator, or directly by some integrated data gathering element of the RFID label, for example, an environmental sensor. This data is retrieved some time later.

Figure 1:
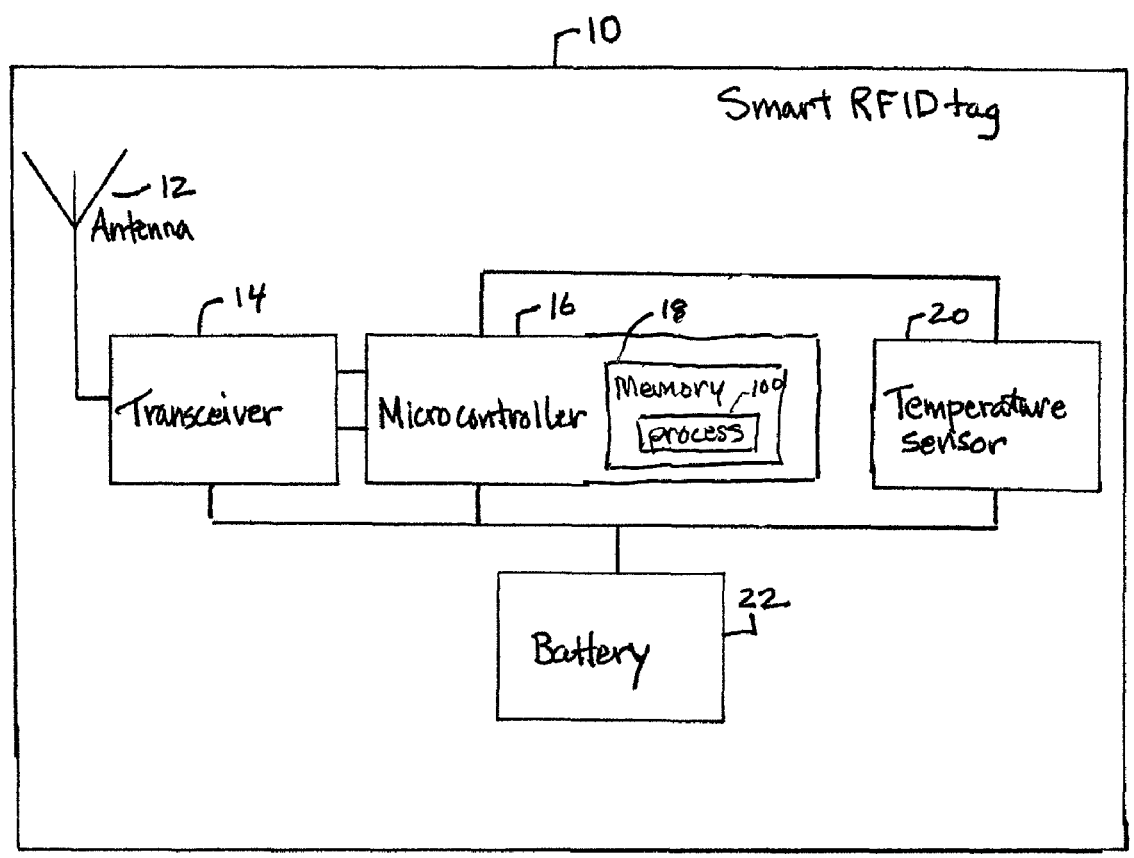
FIG. 1 is a block diagram of an exemplary active radio frequency identification (RFID) label.

As shown in FIG. 1, an exemplary active RFID label 10 includes an antenna 12, a transceiver 14, a microcontroller 16, a temperature sensor 20 and a battery 22. Microcontroller 16 includes several elements including a memory 18. Memory 18 can include a power conservation process 100, fully described below. Temperature sensor 20 senses and transmits temperature data to memory 18 at intervals of time. When triggered by RF interrogation via transceiver 14, microcontroller 16 fetches the data (i.e., time stamp and temperature) and sends it out to an interrogator as multiplexed data packets from transceiver 14. In this manner, a historical temperature log stored in memory 18 in the active RFID label 10 can be retrieved. Temperature logging is limited by the size of memory 18 and/or life of battery 22.

In some examples, RFID label 10 stores a voltage of its battery 22 along with a time and a temperature at each time interval.

Figure 2:
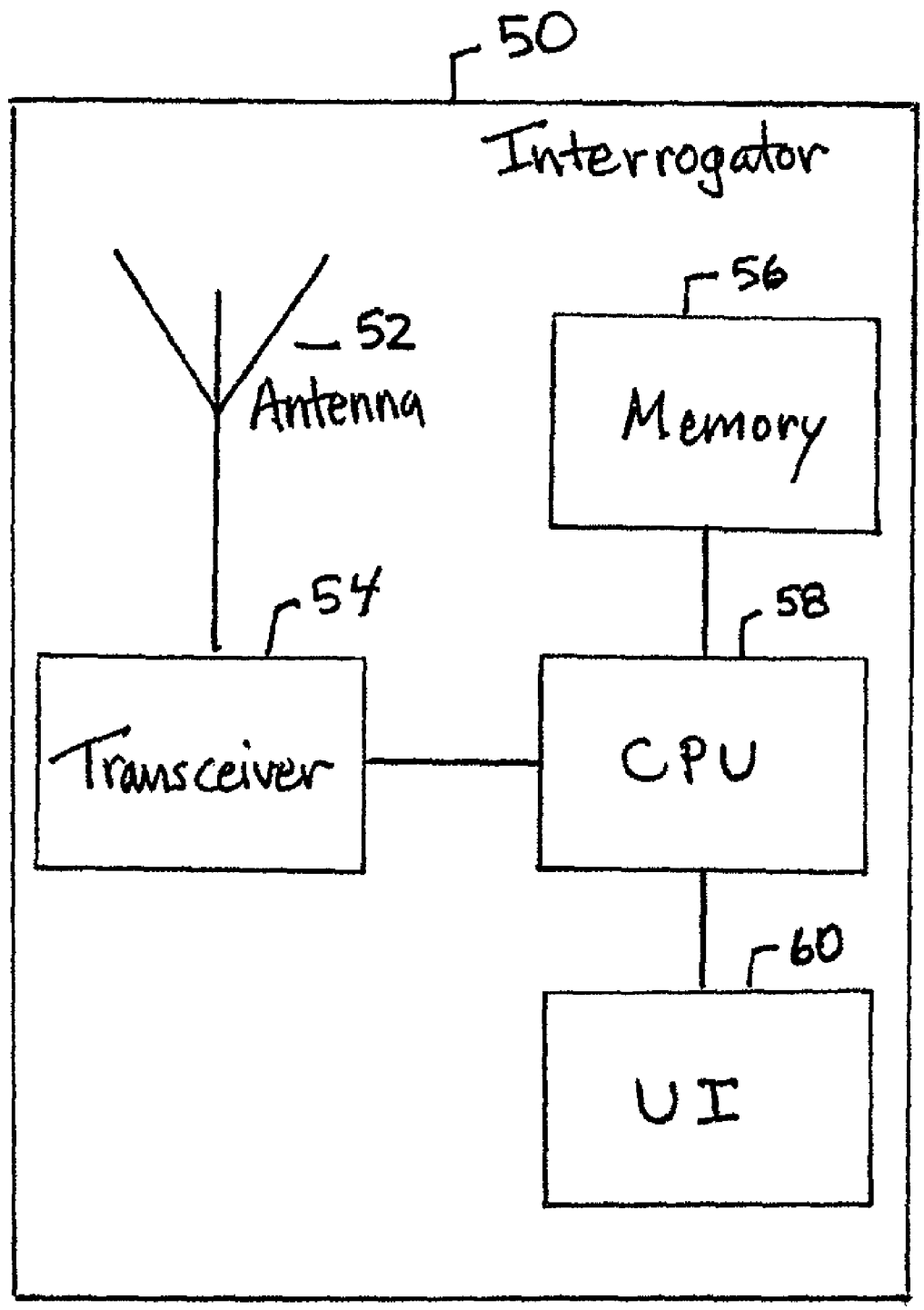
FIG. 2 is a block diagram of an exemplary RFID interrogator.

As shown in FIG. 2, an exemplary RFID interrogator 50 includes an antenna 52, transceiver 54, memory 56, central processing unit (CPU) 58 and optional user interface (UI) 60. The RFID interrogator 50 performs Time Division Multiplexing (TDM) with the transceiver 54 and antenna 52. Data (e.g., time, temperature and/or battery voltage) downloaded from the RFID label 10 can be stored in memory 56.

The RFID interrogator 50 can be used to program the active RFID label 10 to record or log a temperature and/or battery voltage in memory 18 with a time interval starting at an initial time. At each time interval, e.g., every hour, the active RFID label 10 records a time, temperature and/or battery voltage in memory 18. The RFID interrogator 50 can download the time, temperature and/or battery voltage data from memory 18 to memory 56.

Over a period of service, i.e., the recording and storing of time/temperature/voltage, the life of the RFID label battery 22 in the active RFID label 10 can diminish and eventually fail. In one example, if the active RFID label 10 detects reduced voltage in the battery 22, the active RFID label 10 can increase the time interval for temperature and/or voltage readings, thus conserving the remaining life of the battery 22. For example, if the initial time interval in the active RFID label 10 is sixty minutes, the active RFID label 10 will log a time, temperature and/or voltage every sixty minutes. If the active RFID label 10 detects a voltage in the battery is less than 80% capacity, for example, the active RFID label 10 will increase the time interval for readings to, for example, one hundred twenty minutes. At subsequent readings, the active RFID label 10 will increase the time interval for readings as the battery 22 continues to deteriorate, i.e., as a voltage in the battery 22 decreases with each reading, and the active RFID label 10 can continue to increase the time interval for temperature and/or voltage readings, thus extending the remaining life of the battery 22.

In another example, stored data received from the RFID label 10 can be analyzed by the RFID interrogator 50. More specifically, from stored voltage data, the RFID interrogator 50 can determine whether the most recent voltage of the battery 22 is too low, or has dropped below a selected value, or that the voltage of the battery 22 is decreasing at too rapid a rate. In any event, the RFID interrogator 50 can instruct the RFID label 10 to increase its time interval of temperature and/or voltage readings or the RFID interrogator 50 can adjust its frequency of interrogations of RFID label 10.

In another example, the RFID label 10 does not store any time, temperature and/or voltage data. Instead, during each interrogation of RFID label 10, the RFID interrogator 50 requests the RFID label 10 for a current battery voltage and/or temperature. The RFID interrogator 50 can store temperatures and/or voltages over time. In addition, the RFID interrogator 50 can determine to increase its time interval between interrogators based on the currently polled battery voltage.

Figure 3:
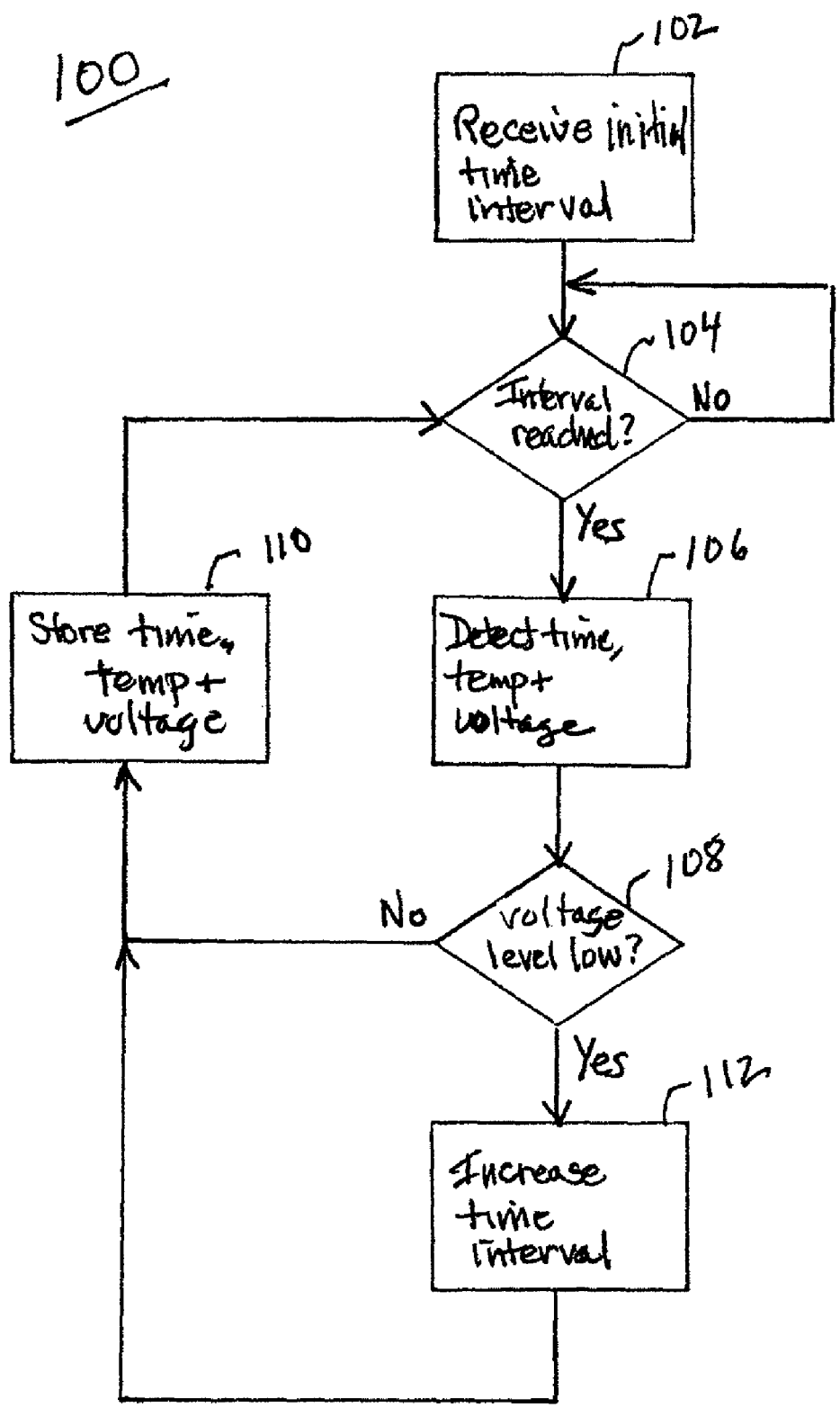
FIG. 3 is a flow diagram.

As shown in FIG. 3, the power conservation process 100 includes receiving (102) an initial time interval. Process 100 determines (104) whether the time interval is reached. If the time interval is reached, process 100 detects (106) a time from its internal clock, a temperature from its temperature sensor and voltage of its power supply, e.g., battery.

Process 100 determines (108) whether the detected voltage has reached a selected reduced level. If the detected voltage has not reached a selected reduced level, process 100 stores (110) the detected time and temperature.

If the detected voltage reached the selected reduced level (or less), process 100 increases (112) the time interval and stores (110) the detected time and temperature.

Process 100 then determines (104) whether the increased time interval is reached.

Process 100 can be incorporated into the memories of other types of RFID labels. For example, process 100 can be used with beacon tags. In general, a beacon tag is an active RF tag that can be factory set to transmit a periodic RF signal used for location, process and presence detection and tracking. Typically, these devices are placed into non-metallic enclosures and transmit an RF signal to an RFID reader located at a distance of 3-10 meters. As the power decreases, process 100 can increase the time at which the period RF signal is transmitted.

Figure 4:
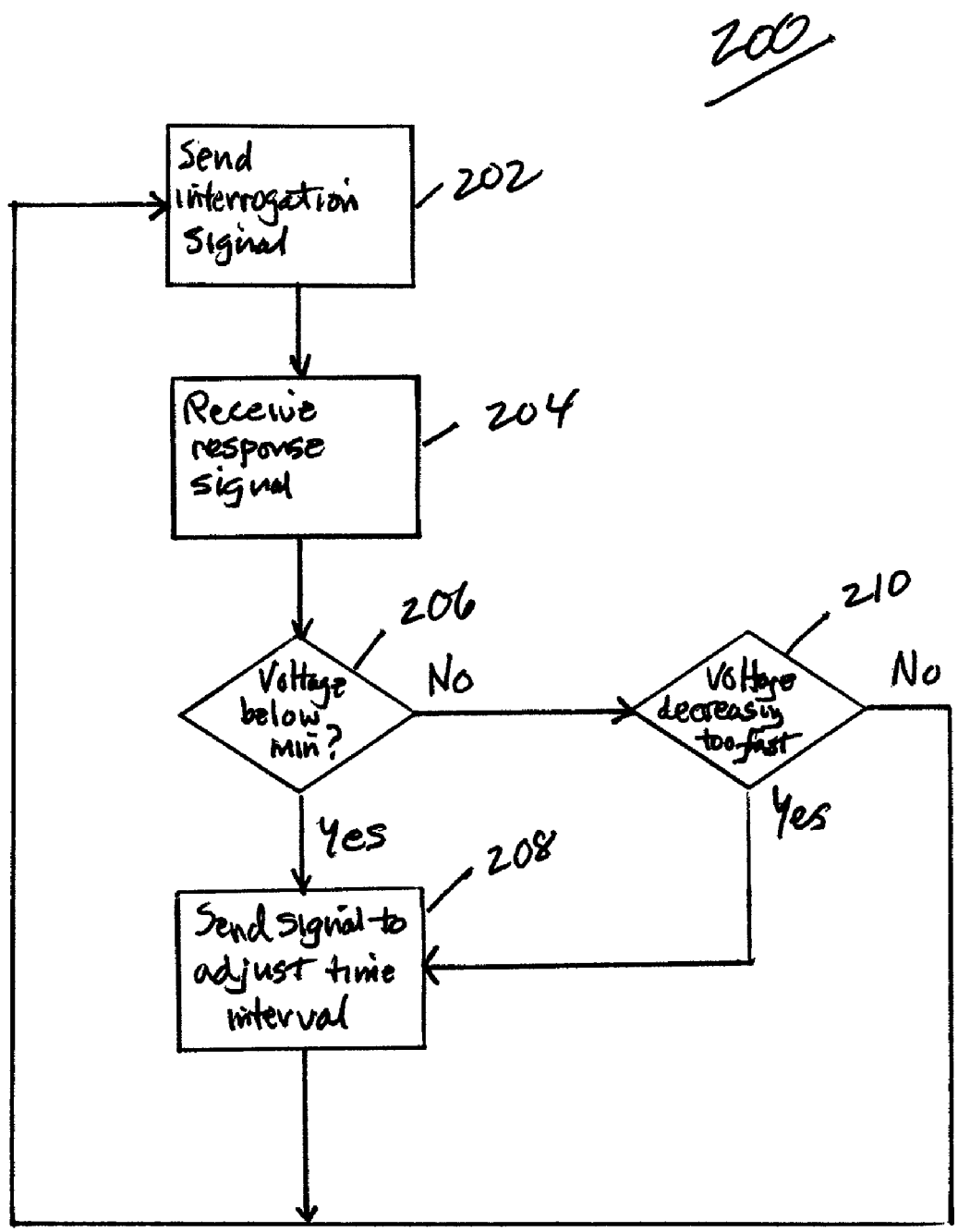
FIG. 4 is a flow diagram.

In another embodiment, memory 56 contains a time interval process 200. As shown on FIG. 4, the time interval process 200 includes sending (202) an interrogation signal to a RFID label. Process 200 receives (204) a response signal from the RFID label containing the label's log of times, temperatures and voltages.

Process 200 determines (206) whether the most recent measured voltage of the label battery is below a minimum voltage. If the most recent voltage of the label is below a minimum, process 200 sends (208) a signal to the RFID label lengthening its time interval.

Process 200 determines (210) whether the rate of voltage decrease of the label battery exceeds a specified rate. The rate of decrease in battery voltage is determined by the RFID interrogator from the received store of battery voltages received from the RFID label during the interrogation. If the rate of decrease of battery voltage exceeds the specified rate, process 200 sends (208) a signal to the RFID label lengthening its time interval.

Figure 5:
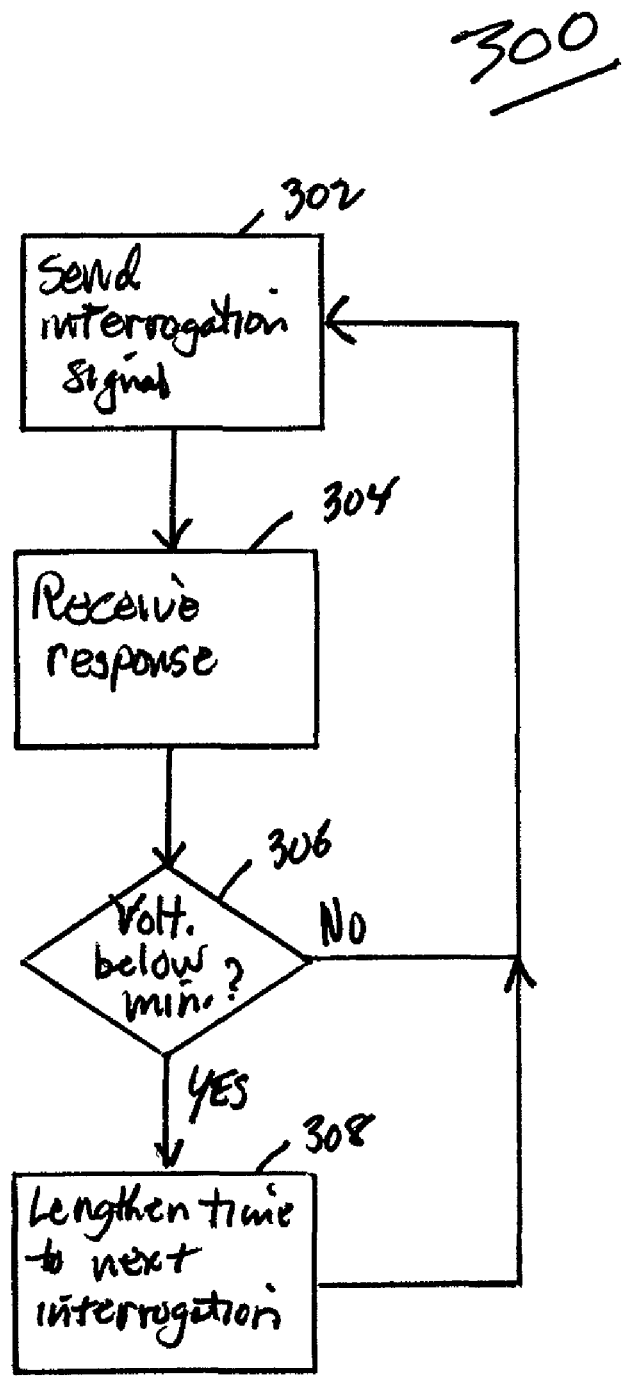
FIG. 5 is a flow diagram.

In another embodiment, memory 56 contains a polling interval process 300. As shown in FIG. 5, the polling interval process 300 includes sending (302) an interrogation signal to a RFID label. Process 300 receives (304) a response signal from the RFID label containing the current battery voltage in the RFID label.

Process 300 determines (306) whether the current battery voltage in the RFID label is below a specified minimum. If the current battery voltage is below the specified minimum, process 300 lengthens (308) a time to sending its next interrogation signal.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A radio frequency identification (RFID) tag comprising:
   a substrate;
   an antenna on the substrate; and
   an integrated circuit operably coupled to a temperature sensor and to the antenna to receive a time interval from a RFID interrogator, the time interval indicating a time when a temperature and a battery voltage associated with the RFID tag are measured, wherein the integrated circuit configured to increase the time interval in the event that a value corresponding to the measured battery voltage is less than a predetermined voltage such that the temperature is measured less frequently than when the battery voltage is greater than or equal to the predetermined voltage.

2. The RFID tag of claim 1 wherein a plurality of temperature and battery voltage are stored over time.

3. The RFID tag of claim 2 wherein the time interval is further increased if a rate of decrease in stored battery voltages exceeds a predetermined rate.

4. A radio frequency identification (RFID) interrogator comprising:
   one or more antennas;
   a receiver communicatively coupled to at least one of the one or more antennas to receive a response from a radio frequency identification (RFID) tag, the response including a time when a temperature and a battery voltage associated with the RFID tag were measured, and values corresponding to the measured temperature and battery voltage;
   a transmitter communicatively coupled to at least one of the one or more antennas to transmit requests; and
   a control unit communicatively coupled to the transmitter and the receiver, wherein the receiver is configured to receive the response and increase a time interval indicating a time for measuring the temperature and the battery voltage associated with the RFID tag in the event that the value corresponding to the measured battery voltage in the response is less than a predetermined voltage such that the temperature is measured less frequently than when the measured battery voltage is greater than or equal to the predetermined voltage.

5. The RFID interrogator of claim 4 wherein the response comprises a plurality of temperatures and battery voltages determined at a plurality of time intervals.

6. The RFID interrogator of claim 5 wherein the time interval is further increased if a rate of decrease in the plurality of battery voltages in the response exceeds a predetermined rate.

7. The RFID interrogator of claim 4 wherein a frequency of transmitted requests from the RFID interrogator to the RFID tag is decreased if the voltage in the response is less than the predetermined voltage.

8. A system for performing radio frequency (RF) communications, the system comprising:
   a radio frequency identification (RFID) tag attached to one or more items to be tracked, the RFID tag being configured to receive a request and a time interval indicating a time for measuring a temperature and a battery voltage, associated with the RFID tag, and to increase the time interval in the event that a value corresponding to the measured battery voltage is less than a predetermined voltage such that the temperature is measured less frequently than when the battery voltage is greater than or equal to the predetermined voltage; and
   an interrogator communicatively coupled to one or more antennas to transmit one or more requests to the RFID tag and to receive one or more responses, at least one response including a time, when the temperature and the battery voltage associated with the RFID tag were measured, and values corresponding to the measured temperature and battery voltage.

9. The system of claim 8 wherein a plurality of temperatures and battery voltages are stored in the RFID tag over time.

10. The system of claim 9 wherein the time interval is further increased by the RFID tag in the event that a rate of decrease in stored battery voltages exceeds a predetermined rate.

11. The system of claim 8 wherein the time interval is further increased by the RFID interrogator in the event that the battery voltage value in the response is less than the predetermined voltage.

12. The system of claim 8 wherein the response comprises a plurality of temperatures and battery voltages determined at each time interval.

13. The system of claim 12 wherein the time interval is further increased by the RFID interrogator in the event that a rate of decrease in the plurality of battery voltages in the response exceeds a predetermined rate.

14. The system of claim 8 wherein a frequency of transmitted requests from the RFID interrogator to the RFID tag is decreased in the event that the battery voltage value in the response is less than the predetermined voltage.

* * * * *